United States Patent
Lai et al.

(10) Patent No.: US 11,641,126 B2
(45) Date of Patent: May 2, 2023

(54) BATTERY CHARGER SYSTEM HAVING A CHARGE PUMP POWER STAGE

(71) Applicant: TEXAS INSTRUMENTS INCORPORATED, Dallas, TX (US)

(72) Inventors: Zheren Lai, Plano, TX (US); Jinrong Qian, Plano, TX (US); Sai Bun Wong, Irving, TX (US); Ryan Erik Lind, Knoxville, TN (US); Alexander Lee McHale, Knoxville, TN (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 726 days.

(21) Appl. No.: 16/039,321

(22) Filed: Jul. 18, 2018

(65) Prior Publication Data

US 2019/0115765 A1 Apr. 18, 2019
US 2020/0266634 A9 Aug. 20, 2020

Related U.S. Application Data

(60) Provisional application No. 62/647,809, filed on Mar. 25, 2018, provisional application No. 62/533,797, filed on Jul. 18, 2017.

(51) Int. Cl.
*H02J 7/02* (2016.01)
*H02M 3/07* (2006.01)
*H02J 7/00* (2006.01)
*G05F 1/575* (2006.01)

(52) U.S. Cl.
CPC ............ *H02J 7/02* (2013.01); *H02J 7/00712* (2020.01); *H02M 3/07* (2013.01); *G05F 1/575* (2013.01); *H02J 7/00* (2013.01); *H02J 2207/20* (2020.01)

(58) Field of Classification Search
CPC .......... H02J 7/008; H02J 2207/20; H02J 7/02; H02J 7/00; H02M 3/07; G05F 1/575
USPC ......................................................... 320/134
See application file for complete search history.

(56) References Cited

U.S. PATENT DOCUMENTS

| | | | |
|---|---|---|---|
| 2005/0225304 A1* | 10/2005 | Vieira Formenti ... | H02J 7/0031 323/211 |
| 2009/0009141 A1* | 1/2009 | Li ......................... | H02J 7/00711 320/141 |
| 2012/0133345 A1* | 5/2012 | Tai ........................... | G05F 1/00 323/282 |
| 2012/0170770 A1* | 7/2012 | Lesso ...................... | H02M 3/07 381/107 |
| 2014/0084845 A1* | 3/2014 | Kung ................... | H02J 7/00712 320/107 |

(Continued)

*Primary Examiner* — Yalkew Fantu
(74) *Attorney, Agent, or Firm* — Ray A. King; Frank D. Cimino

(57) ABSTRACT

A system for charging a battery includes an adapter, and a charger coupled to receive power from the adapter, and to provide a charging current to the battery. The charger includes a power stage with a charge pump to provide the charging current, and a feedback circuit to provide a feedback signal to the adapter. The power stage can be one of: an adjustable current source with voltage clamp, and an adjustable voltage source with current clamp. The charge pump can be implemented as a voltage divider, so that an input adapter current is multiplied by a pre-defined divider ratio to provide the charging current. The charge pump can be one of: single-phase; and multi-phase.

19 Claims, 16 Drawing Sheets

(56) References Cited

U.S. PATENT DOCUMENTS

| | | | | |
|---|---|---|---|---|
| 2014/0167509 A1* | 6/2014 | Fernald | ............... | H02M 3/07 |
| | | | | 307/31 |
| 2015/0069957 A1* | 3/2015 | Chang | ............ | H02J 2207/20 |
| | | | | 320/107 |
| 2017/0237276 A1* | 8/2017 | Onishi | ............... | H02M 3/07 |
| | | | | 320/108 |
| 2018/0013303 A1* | 1/2018 | Wu | .................... | H02J 7/022 |

* cited by examiner

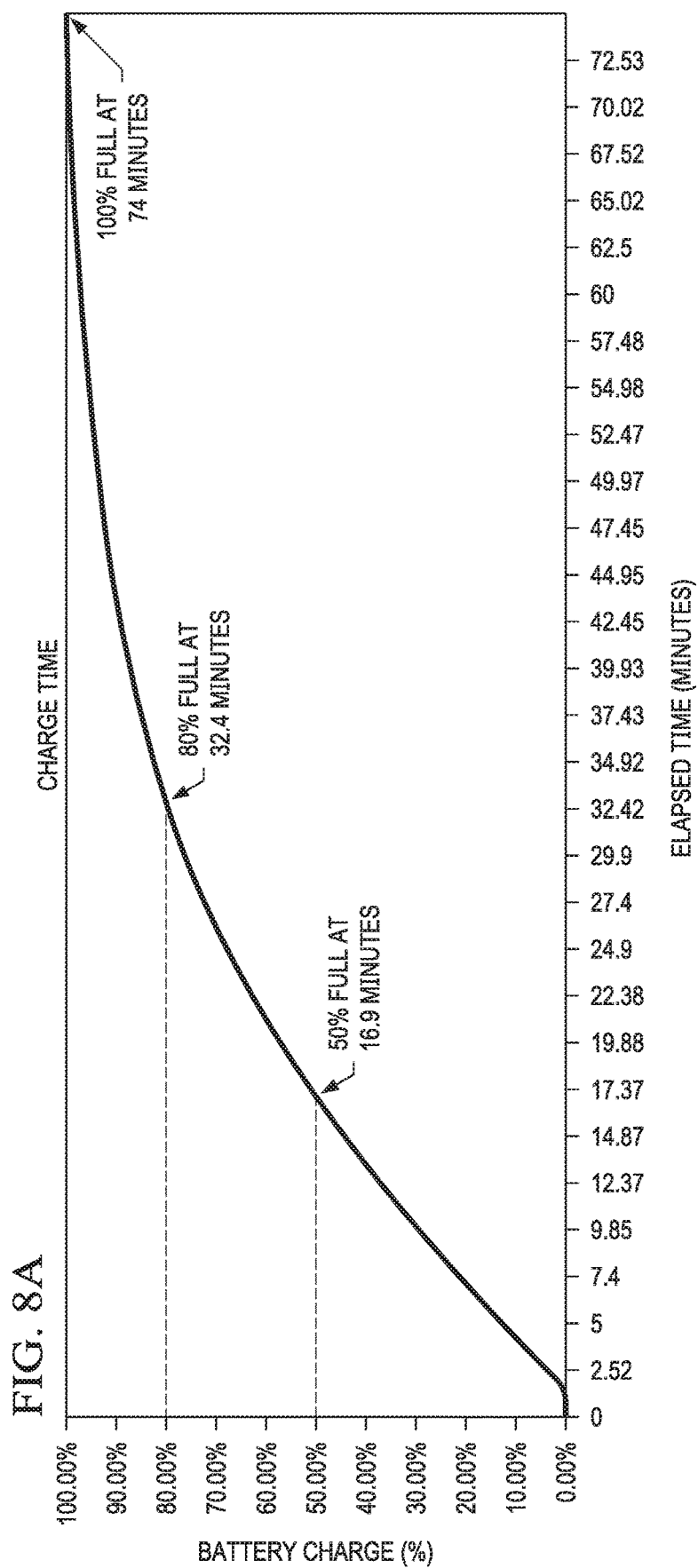

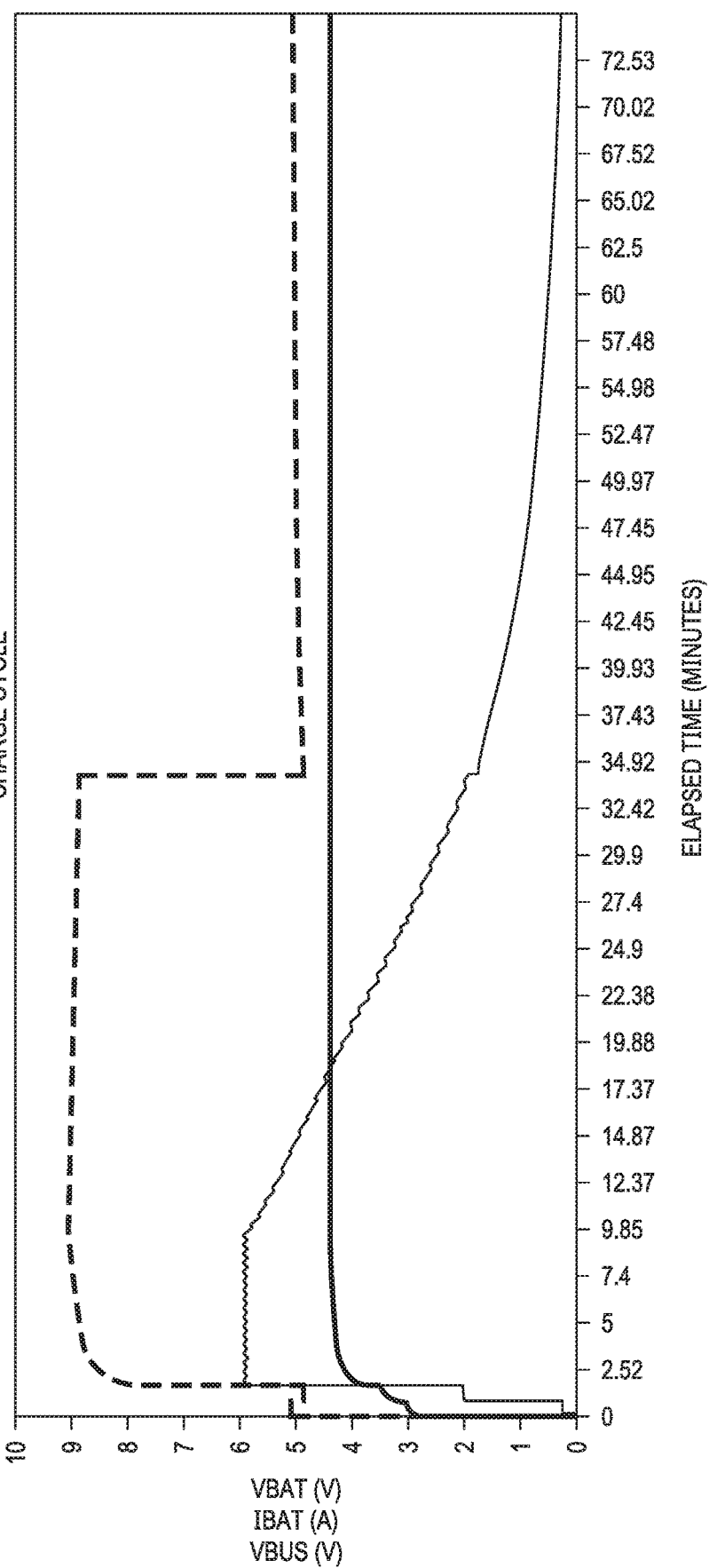

BATTERY CHARGER SYSTEM HAVING A CHARGE PUMP POWER STAGE

CROSS-REFERENCE TO RELATED APPLICATIONS

Priority is claimed under 37 CFR 1.78 and 35 USC 119(e) to U.S. Provisional Application 62/533,797, filed 2017 Jul. 18, and U.S. Provisional Application 62/647,809, filed 2018 Mar. 25, each of which is incorporated by reference in its entirety.

BACKGROUND

Battery charging systems provide charging current to battery-powered devices, such as mobile phones. Device batteries are increasing in both size and supported charging rates. A 3,000-mAh battery can be capable of charging at 6 A, but charger efficiency—and consequently, the power dissipated in the phone—can be a limiting factor to charging at this rate.

Rapid-charging power adapters can designed to provide high charging currents, although disadvantages of current rapid charging solutions can include: (a) expensive cabling from the adapter; (b) large inductors; and (c) significant power dissipation.

BRIEF SUMMARY

This Brief Summary is provided as a general introduction to the Disclosure provided by the Detailed Description and Drawings, summarizing aspects and features of the Disclosure. It is not a complete overview of the Disclosure, and should not be interpreted as identifying key elements or features of, or otherwise characterizing or delimiting the scope of, the disclosed invention.

The Disclosure describes apparatus and methods for a switched-capacitor current multiplication battery charger architecture.

According to aspects of the Disclosure, a system for charging a battery includes an adapter, and a charger coupled to receive power from the adapter, and to provide a charging current to the battery. The charger includes a power stage with a charge pump to provide the charging current, and a feedback circuit to provide a feedback signal to the adapter. The power stage can be one of: an adjustable current source with voltage clamp, and an adjustable voltage source with current clamp. The charge pump can be implemented as a voltage divider, so that an input adapter current is multiplied by a pre-defined divider ratio to provide the charging current. The charge pump can be one of: single-phase; and multi-phase.

Other aspects and features of the invention claimed in this Patent Document will be apparent to those skilled in the art from the following Disclosure.

BRIEF DESCRIPTION OF THE DRAWINGS

FIGS. 5A and 5B illustrate example efficiency curves for: FIG. 5A four CFLY capacitors per phase; and FIG. 5B three CFLY capacitors per phase.

FIGS. 8A and 8B provide example plots illustrating example charge-cycle data and example total charge-time data.

DETAILED DESCRIPTION

This Description and the Drawings constitute a Disclosure for a switched-capacitor current multiplication (charge pump) battery charger architecture, including describing design examples (example implementations), and illustrating various technical features and advantages.

In brief overview, a switched-capacitor current multiplication (charge pump) battery charger system includes an adapter, and a charger coupled to receive power from the adapter, and to provide a charging current to the battery. The charger includes a power stage with a charge pump to provide the charging current, and a feedback circuit to provide a feedback signal to the adapter. The power stage can be one of: an adjustable current source with voltage clamp, and an adjustable voltage source with current clamp. The charge pump can be implemented as a voltage divider, so that an input adapter current is multiplied by a pre-defined divider ratio to provide the charging current. The charge pump can be one of: single-phase; and multi-phase.

Figure 1A:
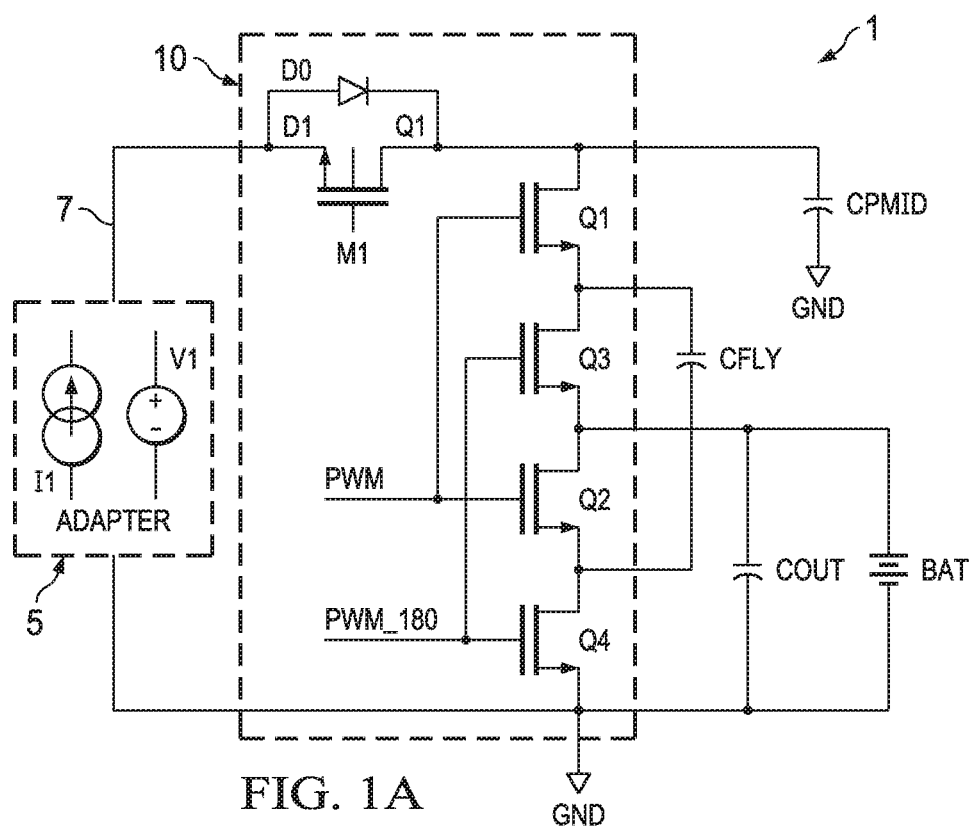
FIGS. 1A and 1B illustrate an example battery charge system 1 that includes a power adapter 5 coupled over a bus 7 to a device (such as a mobile phone) that includes a switched-capacitor current multiplication battery charger 10 according to the Disclosure.
Figure 1B:
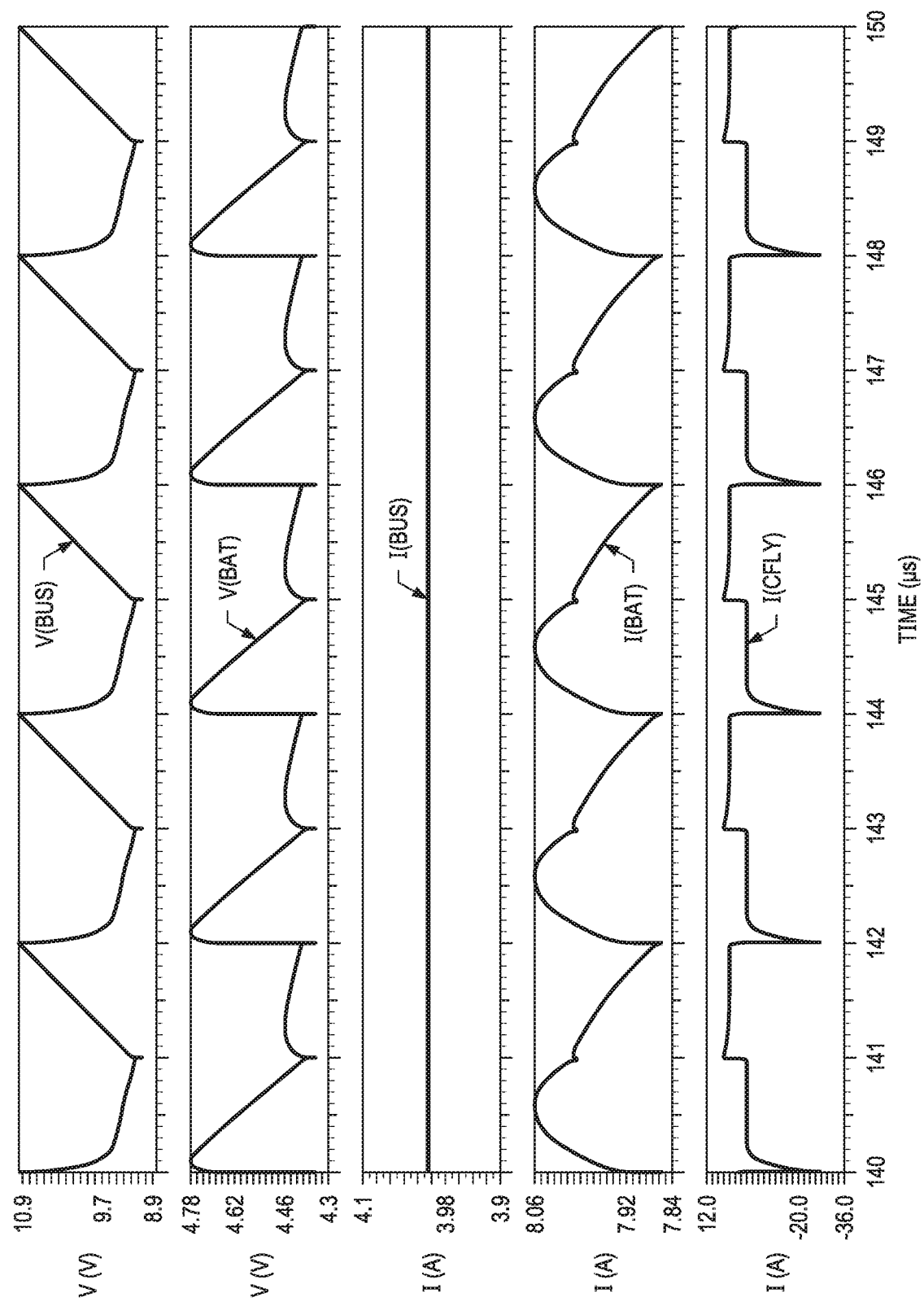

FIGS. 1A and 1B illustrate an example battery charge system 1 that includes a power adapter 5 coupled over a bus 7 to a device (such as a mobile phone) that includes a switched-capacitor current multiplication battery charger 10 according to the Disclosure (sometimes referred to as a current multiplication battery charger or battery charger). Adapter 5 is configured to provide to the battery charger controlled power based on battery voltage and current, with feedback provided by the battery charger, such as a PPS (programmable power supply) wall adapter.

FIG. 1A illustrates the example switched-capacitor current multiplication battery charger 10, configured with a single power stage (power phase). A multi-phase/stage configuration is described in connection with FIGS. 9A/9B.

The switched-capacitor current multiplication battery charger 10 receives power from the adapter 5 (through transistor M1). The battery charger includes four switches Q1-Q4 controlled to alternately charge and discharge the flying (charge pump) capacitor CFLY. FIG. 1B illustrates example waveforms for V(BUS), V(BAT), I(BUS), I(BAT), and I(CFLY).

Figure 2B:
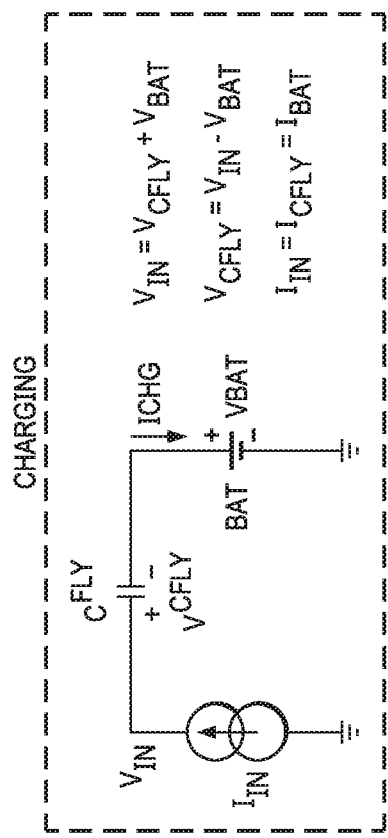
FIGS. 2A-2C illustrate an example simplified switched-capacitor charge pump, along with the equations for voltage and current during charging and discharging of CFLY capacitors.
Figure 2C:
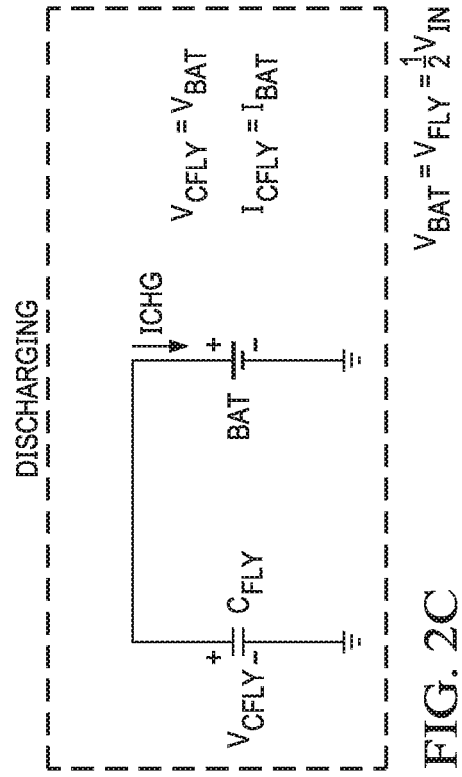
Figure 2A:
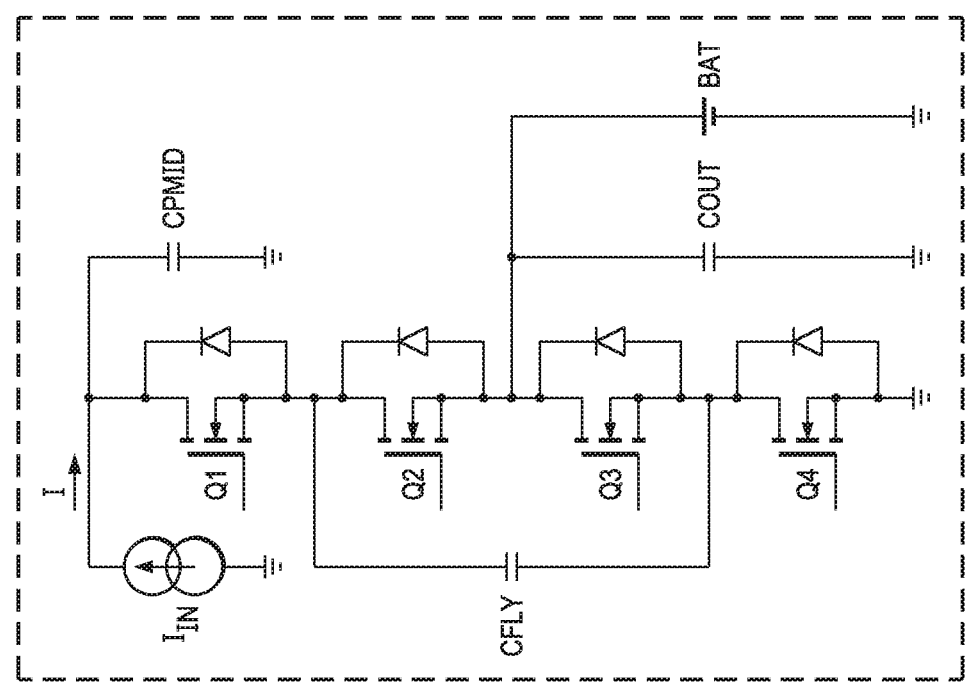

FIGS. 2A-2C illustrate an example simplified switched-capacitor charge pump, along with the equations for voltage and current during charging and discharging of CFLY capacitors.

In the charging phase ($t_1$), Q1 and Q3 turn on and Q2 and Q4 turn off. This enables CFLY to be in series with the battery, where CFLY charges while delivering current to the battery. During the discharge phase ($t_2$), Q1 and Q3 turn off and Q2 and Q4 turn on. During this time, the CFLY capacitor is parallel to the battery and provides charging current to it. The duty cycle is 50%, the battery current is half of the input voltage and the current delivered to the battery is twice the input current.

Figure 3B:
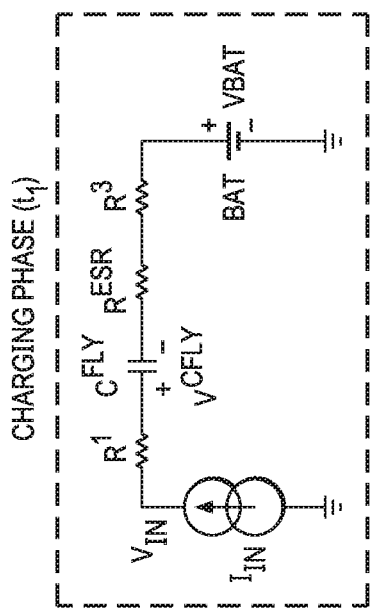
FIGS. 3B-3C illustrate circuit models with equivalent series resistance of CFLY, as well as the resistances of the switches Q1-Q4.
Figure 3C:
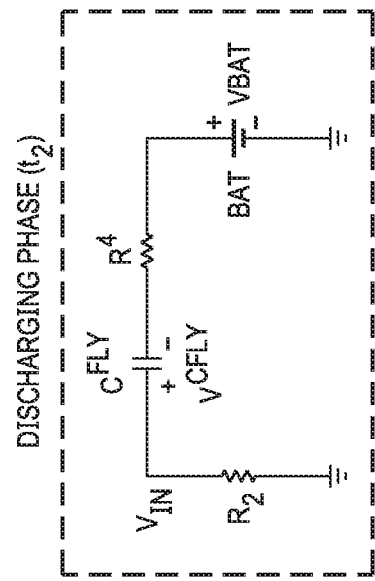
Figure 3A:
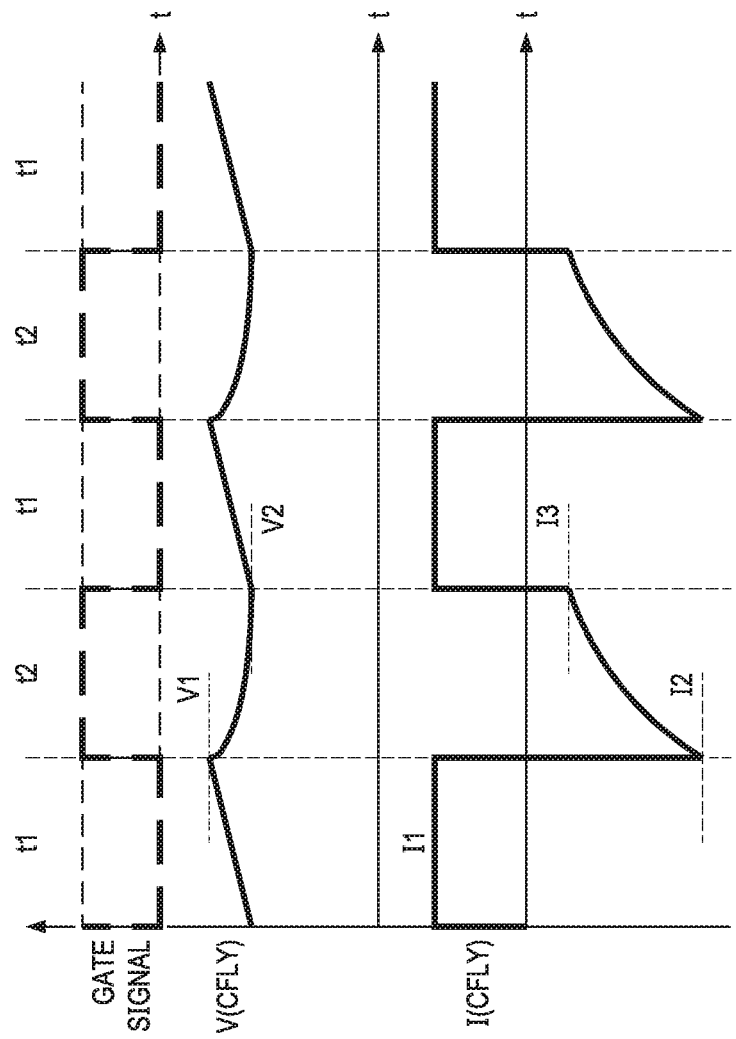
FIG. 3A illustrates example waveforms for battery current and voltage.

FIG. 3A illustrates example waveforms for battery current and voltage. FIGS. 3B-3C illustrate circuit models with equivalent series resistance of CFLY, as well as the resistances of the switches Q1-Q4.

Figure 4A:
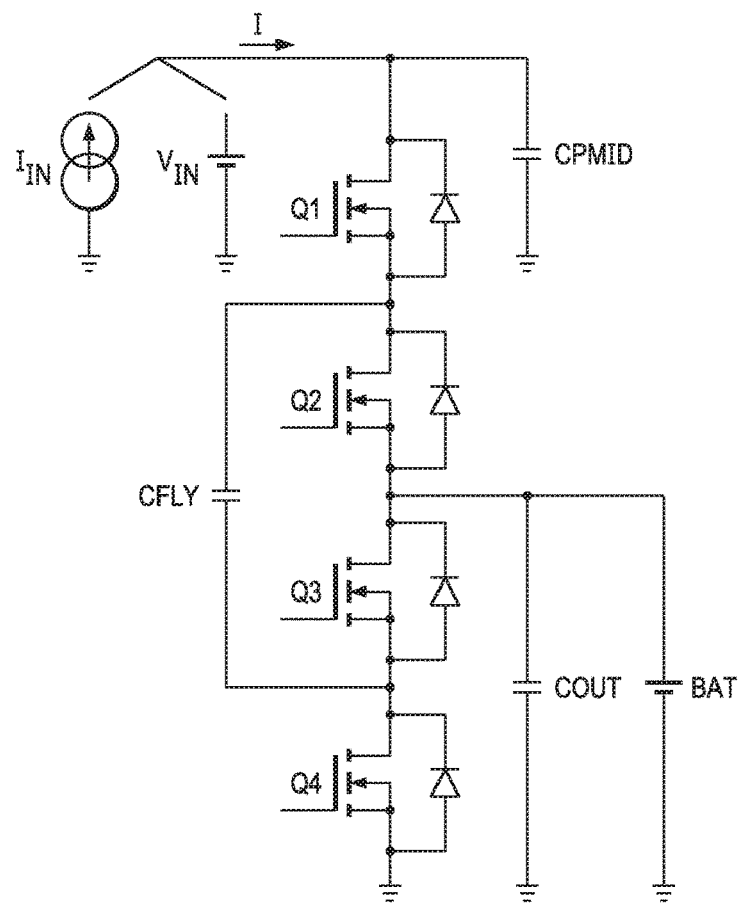
FIGS. 4A-4B illustrate an example switched-capacitor current multiplication battery charger with a constant current source, including representative V(CFLY) and I(CFLY) waveforms.
Figure 4B:
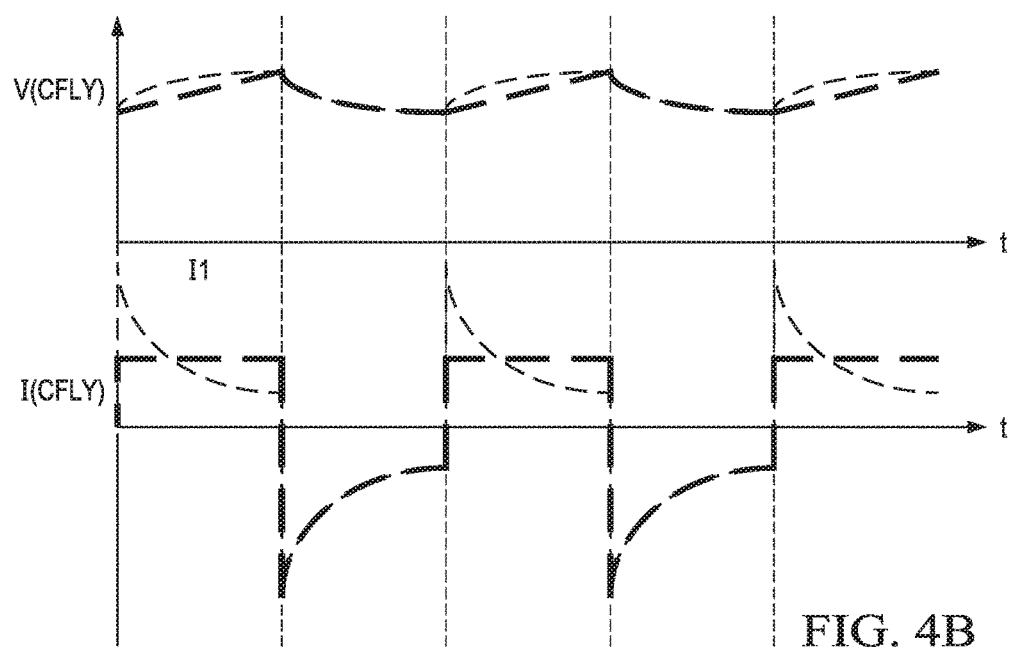

FIGS. 4A-4B illustrate an example switched-capacitor current multiplication battery charger with a constant current source, including representative V(CFLY) and I(CFLY) waveforms. When using a constant current source, the CFLY current is constant while CFLY charges. If using a constant voltage source, the CFLY current follows the resistor-capacitor constant curve as shown in FIG. 4B. The effect of using a voltage source instead of a current source is to increase ripple current and RMS current, and to reduce efficiency due to higher conduction losses.

CFLY capacitor selection is an important design consideration. A recommended configuration includes two to four CFLY capacitors per phase. Additional CFLY capacitors can be used, but with diminishing returns, and at the expense of cost and board space.

Using fewer than four CFLY capacitors results in higher voltage and current ripple, and increased stress on each capacitor. The total effective capacitance should be 24 µF or greater for optimal efficiency. Using four 22-µF capacitors with a 10-V rating will achieve a 24-µF capacitance, taking into account the bias voltage derating of the ceramic capacitors. A slower switching frequency can increase efficiency, but this also comes at the expense of high current ripple and increased stress on each capacitor.

Figure 5A:
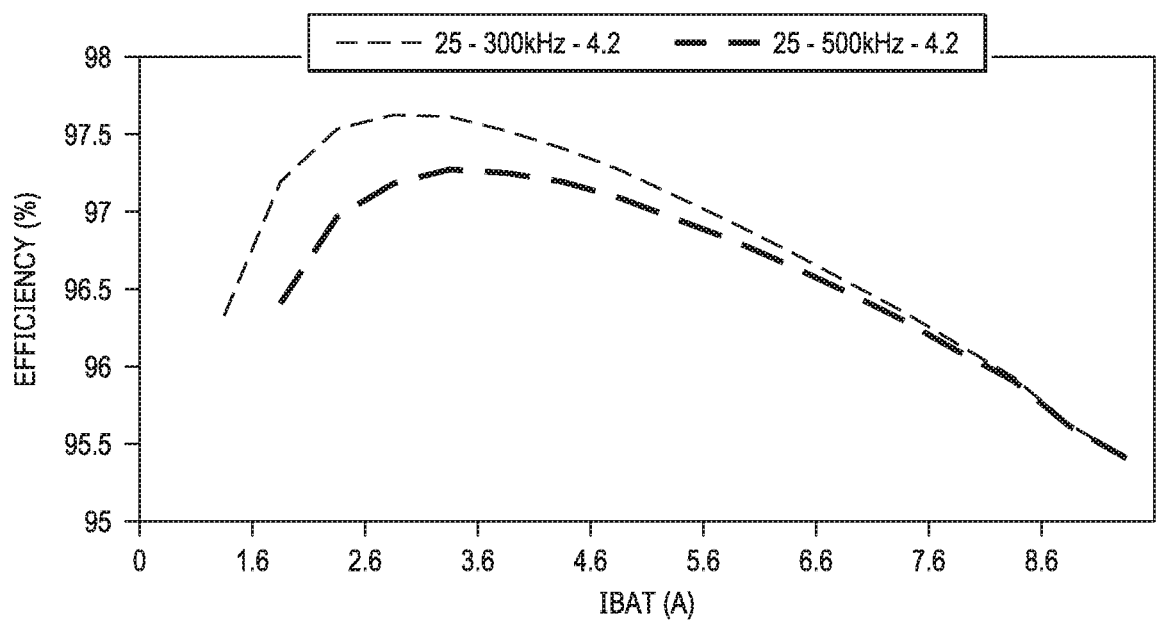
Figure 5B:
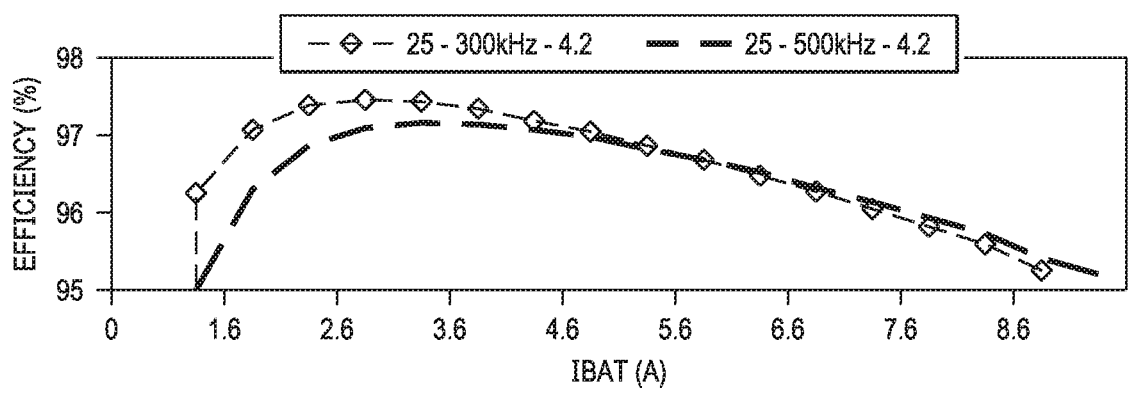

FIGS. 5A and 5B illustrate example efficiency curves for: FIG. 5A four CFLY capacitors per phase; and FIG. 5B three CFLY capacitors per phase. The effect of the number of CFLY capacitors and switching frequency clearly evident.

Referring to FIG. 1A, the adapter 5 provides controlled voltage and current to the switched-capacitor current multiplication battery charger 10, with feedback from the battery charger based on sensed VBAT and IBAT. An example adapter is a PPS wall adapter. The USB PD specification has incorporated support for direct charge adapters with PPS. The PPS protocol enables switched capacitor chargers, while also supporting legacy USB 2.0, USB 3.1, USB Type-C current or BCS 1.2 voltage and currents.

The wall adapter (source) 2 preferably implements protection, without relying on the current multiplication battery charger 10 (sink). Similarly, the battery charger 10 preferably implements protection, without relying on the adapter (source). The adapter/source can also implement overcurrent protection.

For the switched-capacitor current multiplication battery charger architecture according to the Disclosure, the adapter/source should provide adjustable power based on the sink requirements. As an example, the source can be configured to adjust the output voltage in 20-mV increments and the current in 10-mA increments.

Figures 6, 7:
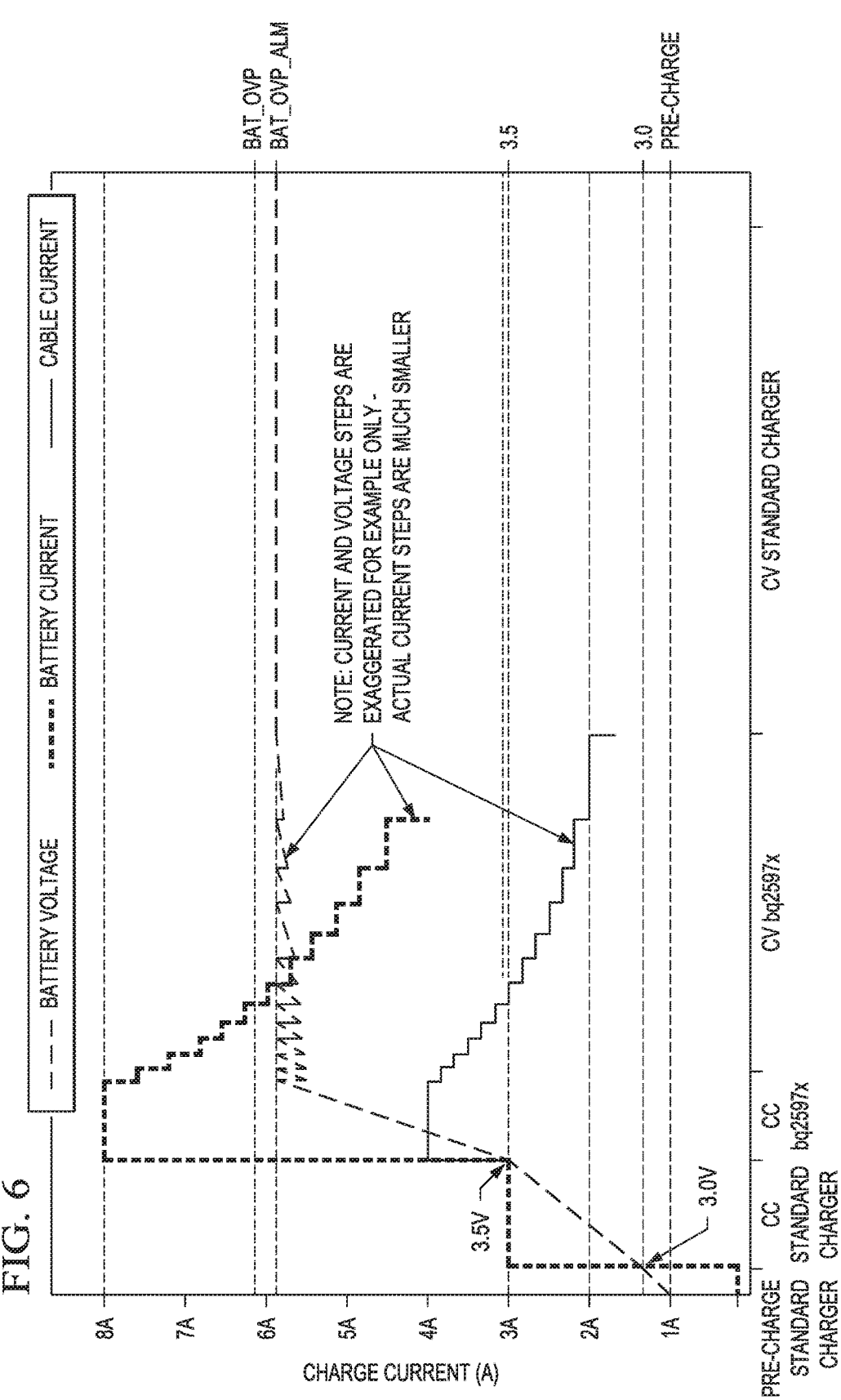
FIG. 6 illustrates an example battery-charger profile for a switched-capacitor current multiplication architecture according to the Disclosure.
FIG. 7 is an example flow diagram illustrating switched-capacitor current multiplication batter charging according to the Disclosure.
Figure 7A:
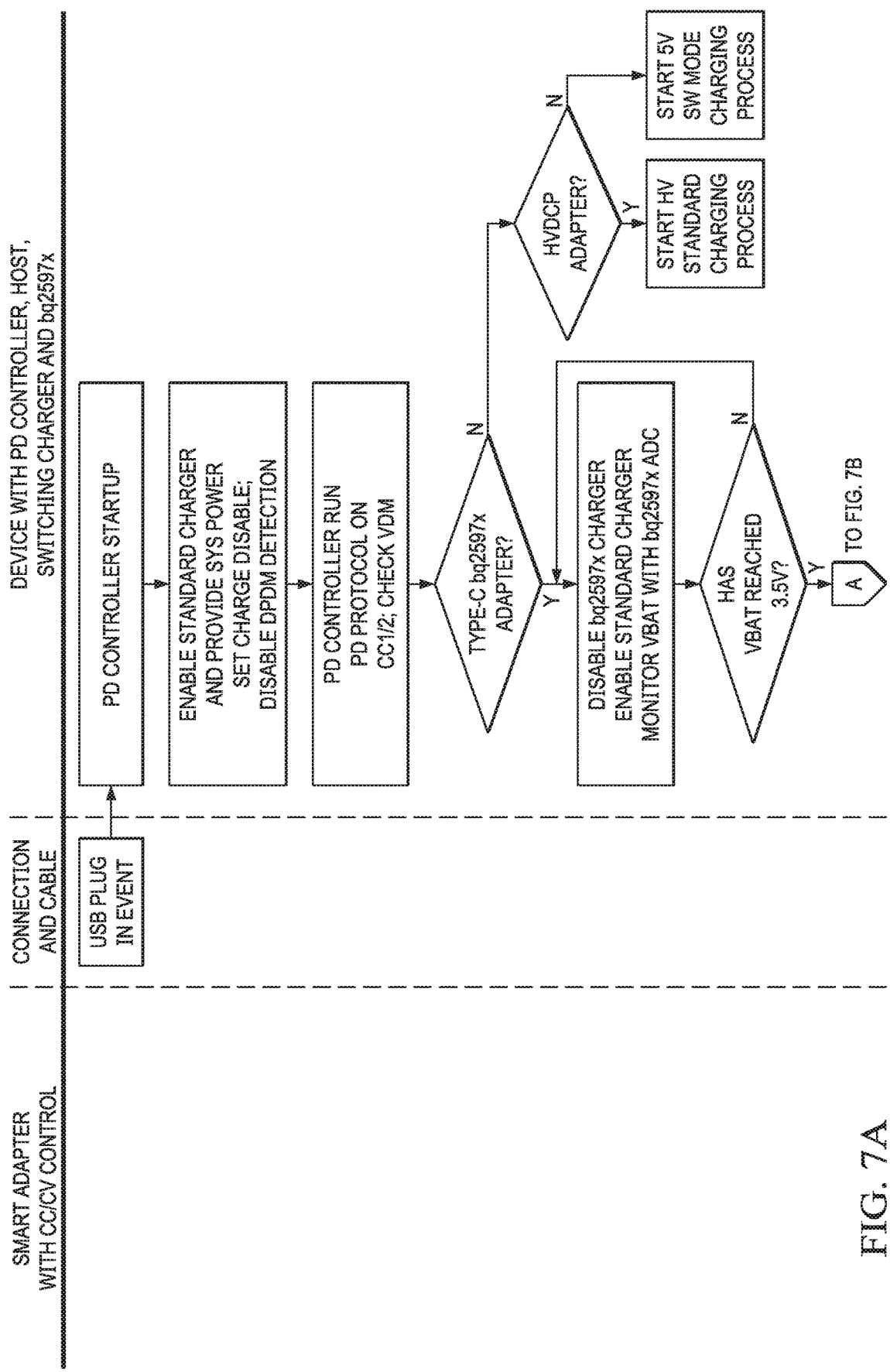
Figure 7B:
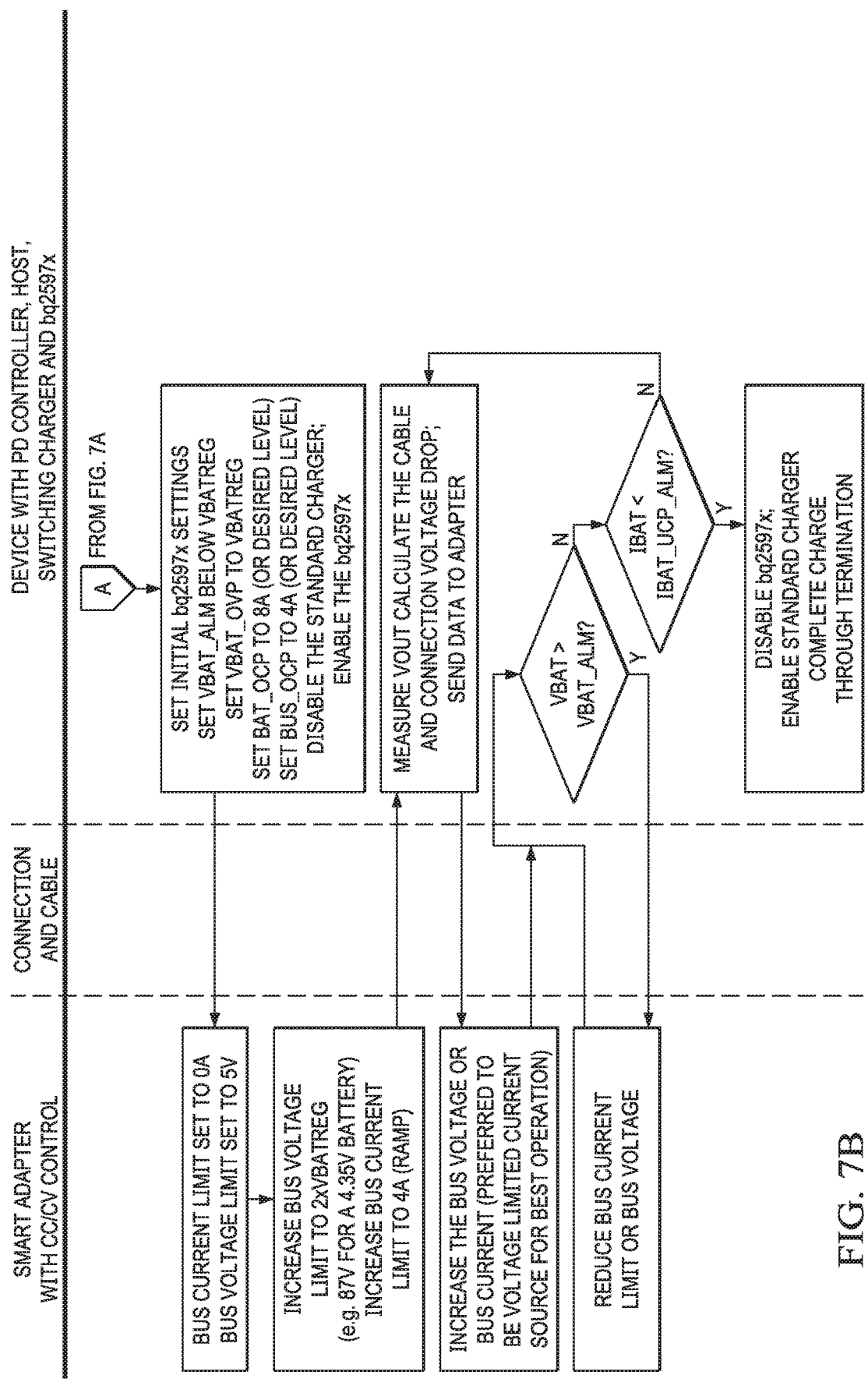

FIG. 6 illustrates an example battery-charger profile for a switched-capacitor current multiplication architecture according to the Disclosure. The switched-capacitor current multiplication architecture can be used with a battery-charger profile that includes pre-charge and final termination. The combination of an adapter source and a such a charger profile enables the system to accomplish the battery-charge profile shown in FIG. 6.

If the battery being charged is below a predefined voltage, such as 3.5 V, the charger is used during pre-charge and constant-current charging until reaching that predefined voltage. At that time, the battery charger 10 (device) provides feedback to the adapter/source (such as over a communication channel of a Type-C cable) to increase the voltage/current to meet pre-defined charging requirements (battery-charging profile).

Once the battery voltage reaches a voltage near the final charging voltage, the adapter reduces the voltage/current in small increments to prevent a battery overvoltage condition.

Once the PPS reduces the voltage/current so that the charging current is below the undercurrent threshold for the switched-capacitor device, charging stops and charging can resume according to a predefined battery-charging profile for current tapering and final termination.

FIG. 7 is an example flow diagram illustrating switched-capacitor current multiplication batter charging according to the Disclosure. Referring also to FIG. 1A, initially, 5 V is present on the bus 7, which is then negotiated depending on the capabilities and state of the adapter/sink. The example battery-charging flow is as follows. The adapter 5 is configured as an example flyback controller, with a synchronous rectifier, and current shunt monitor. An example, a USB PD controller and example microcontroller can be used to execute the control code. The device includes a switched-capacitor current multiplication battery charger according to the Disclosure, configured for use with the USB PD Type-C port controller interface (TCPCi) and example microcontroller (such as a MSP430).

FIGS. 8A and 8B provide example plots illustrating example charge-cycle data and example total charge-time data.

Figure 9A:
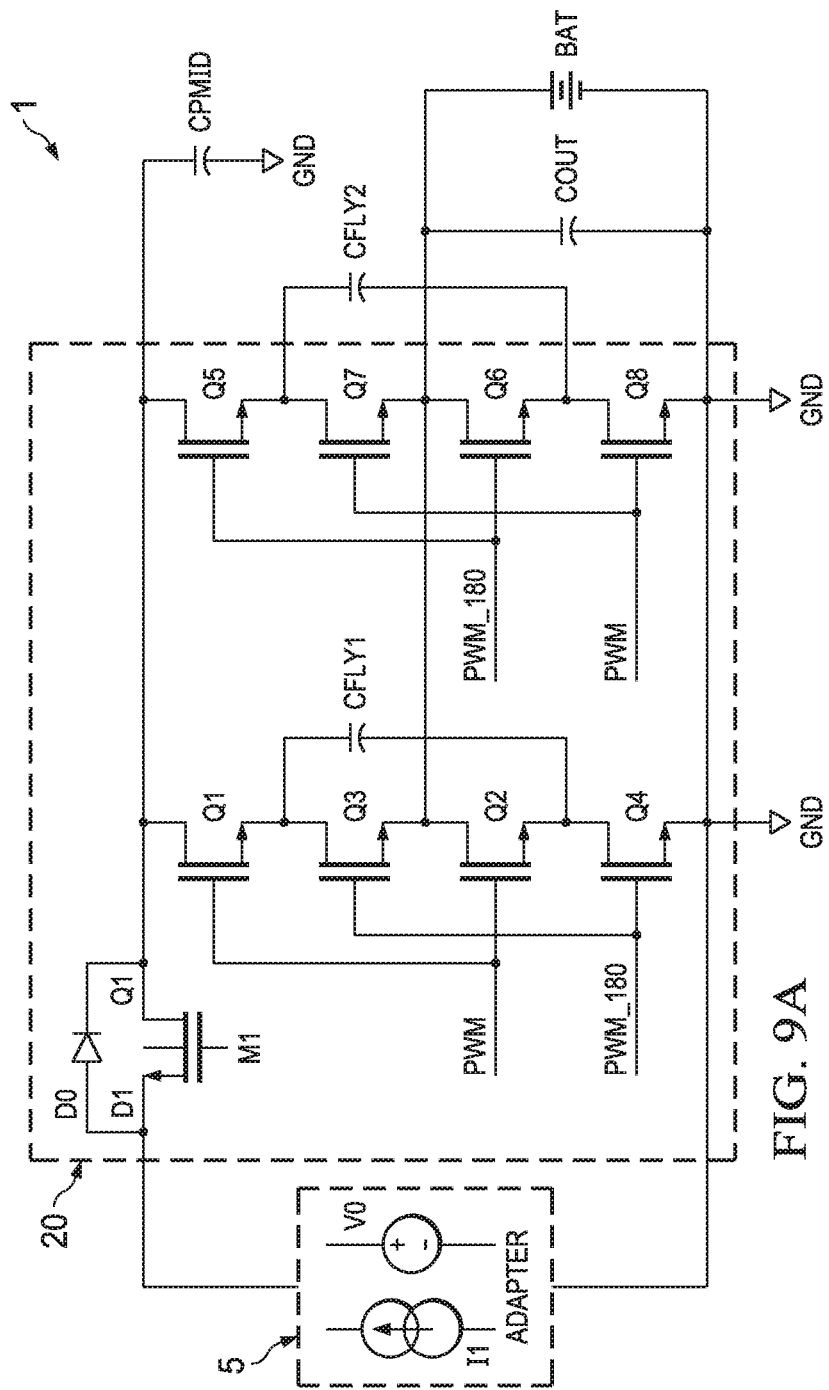
FIGS. 9A and 9B illustrates an example switched-capacitor current multiplication battery charger 20 according to the Disclosure, configured with a dual power stage (power phase).
Figure 9B:
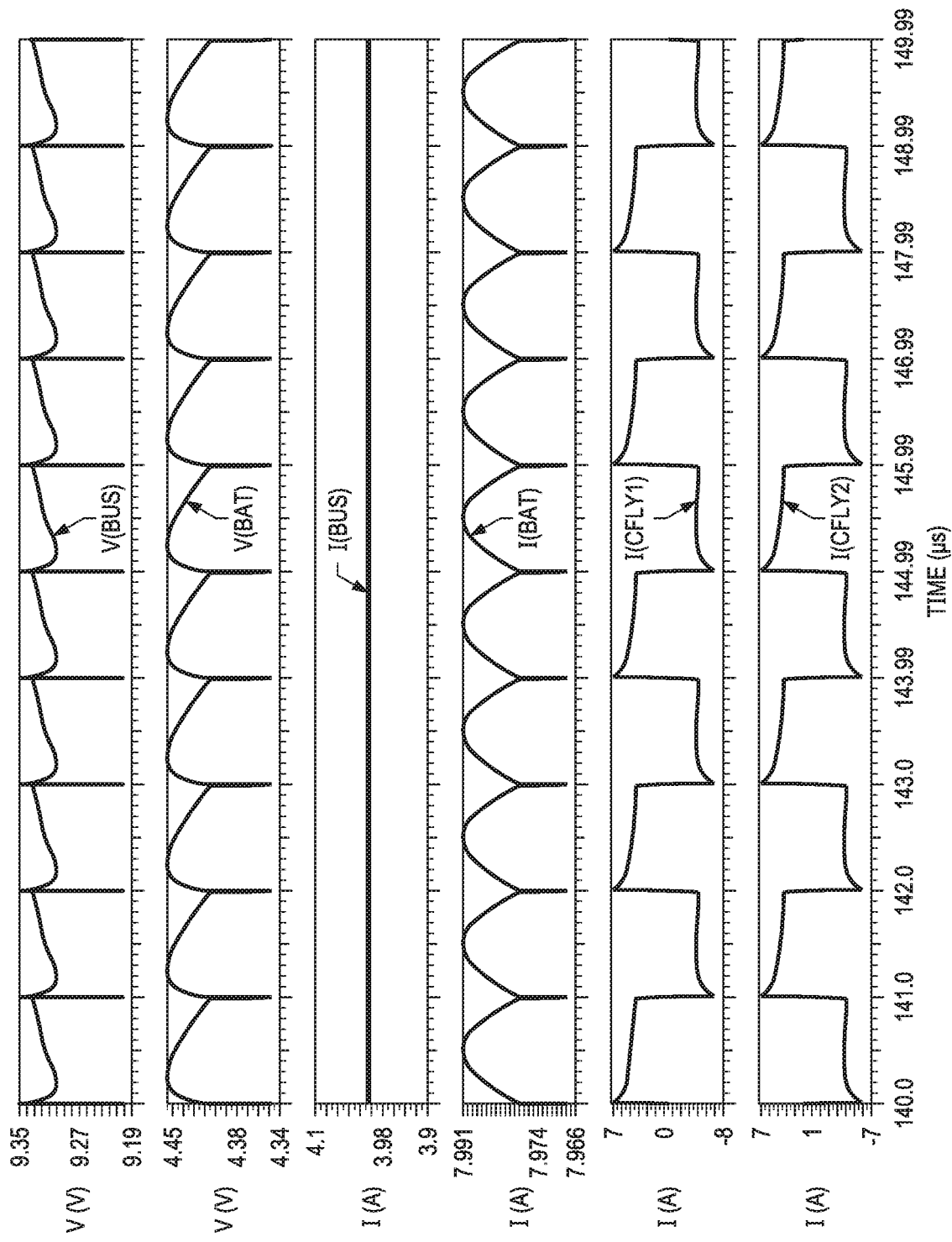

FIGS. 9A and 9B illustrates an example switched-capacitor current multiplication battery charger 20 according to the Disclosure, configured with a dual power stage (power phase).

The switched-capacitor current multiplication battery charger 20 receives power from the adapter 5 (through transistor M1). The battery charger includes dual-stage switches Q1-Q4 and Q5-Q8, controlled to alternately charge and discharge respective flying (charge pump) capacitors CFLY1 and CFLY2. FIG. 9B illustrates example waveforms for V(BUS), V(BAT), I(BUS), I(BAT), and I(CFLY).

As described above in connection with the single stage/phase switched-capacitor current multiplication battery charger, the CFLY1 and CFLY2 capacitors can be implemented with two to four CFLY capacitors per phase.

Figure 10A:
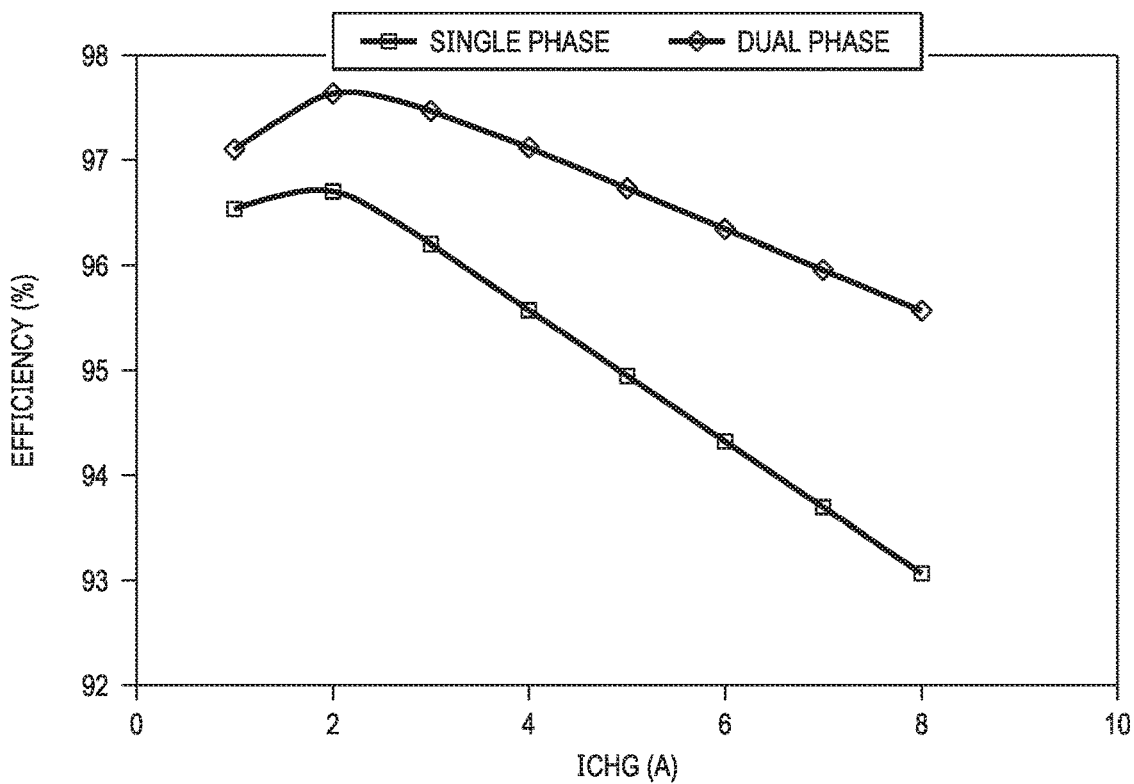
FIGS. 10A and 10B provide example plots illustrating improvements in efficiency and ripple performance for multi-phase configurations.
Figure 10B:
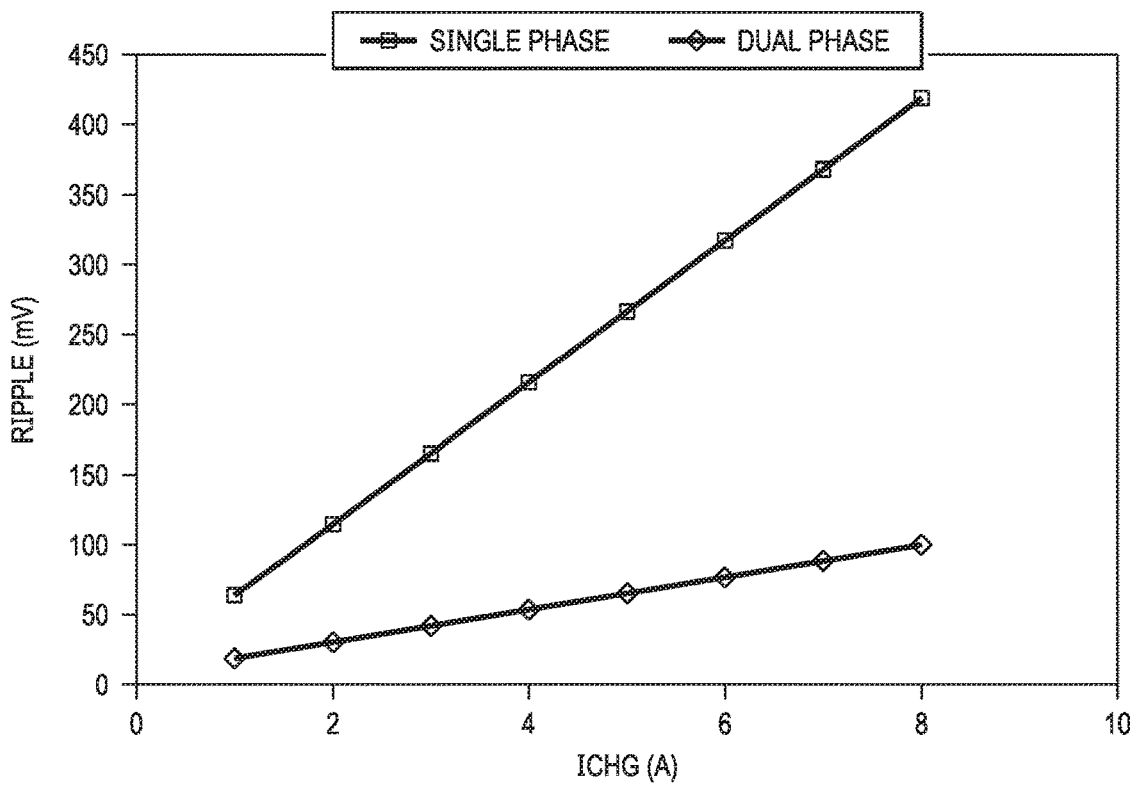

FIGS. 10A and 10B provide example plots illustrating improvements in efficiency and ripple performance for multi-phase configurations.

Figure 11A:
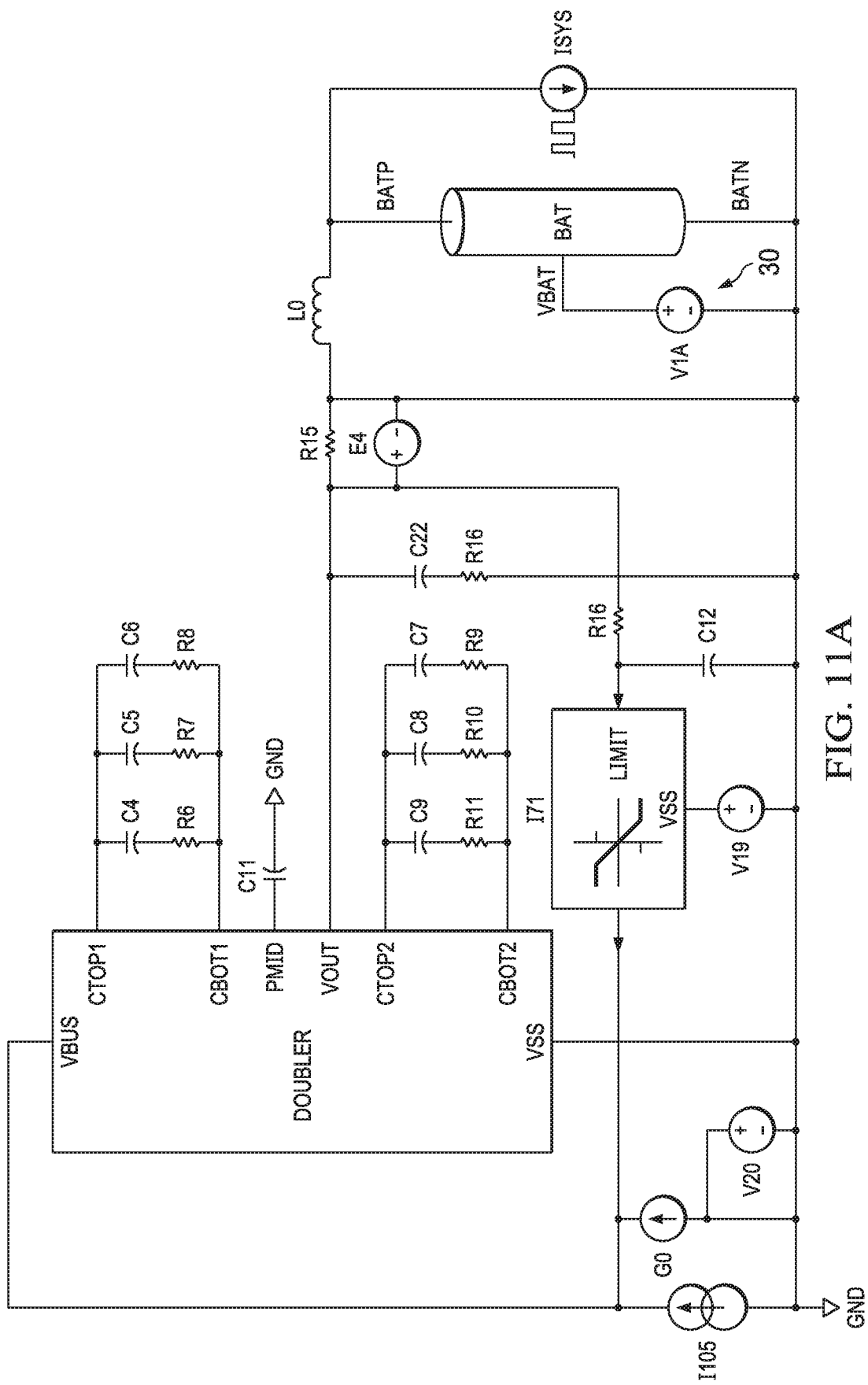
FIGS. 11A and 11B illustrate an example battery charge system board implementation, such as for a mobile phone, including a dual-phase switched-capacitor current multiplication battery charger 30 according to the Disclosure, with FIG. 11B illustrating example system load.
Figure 11B:
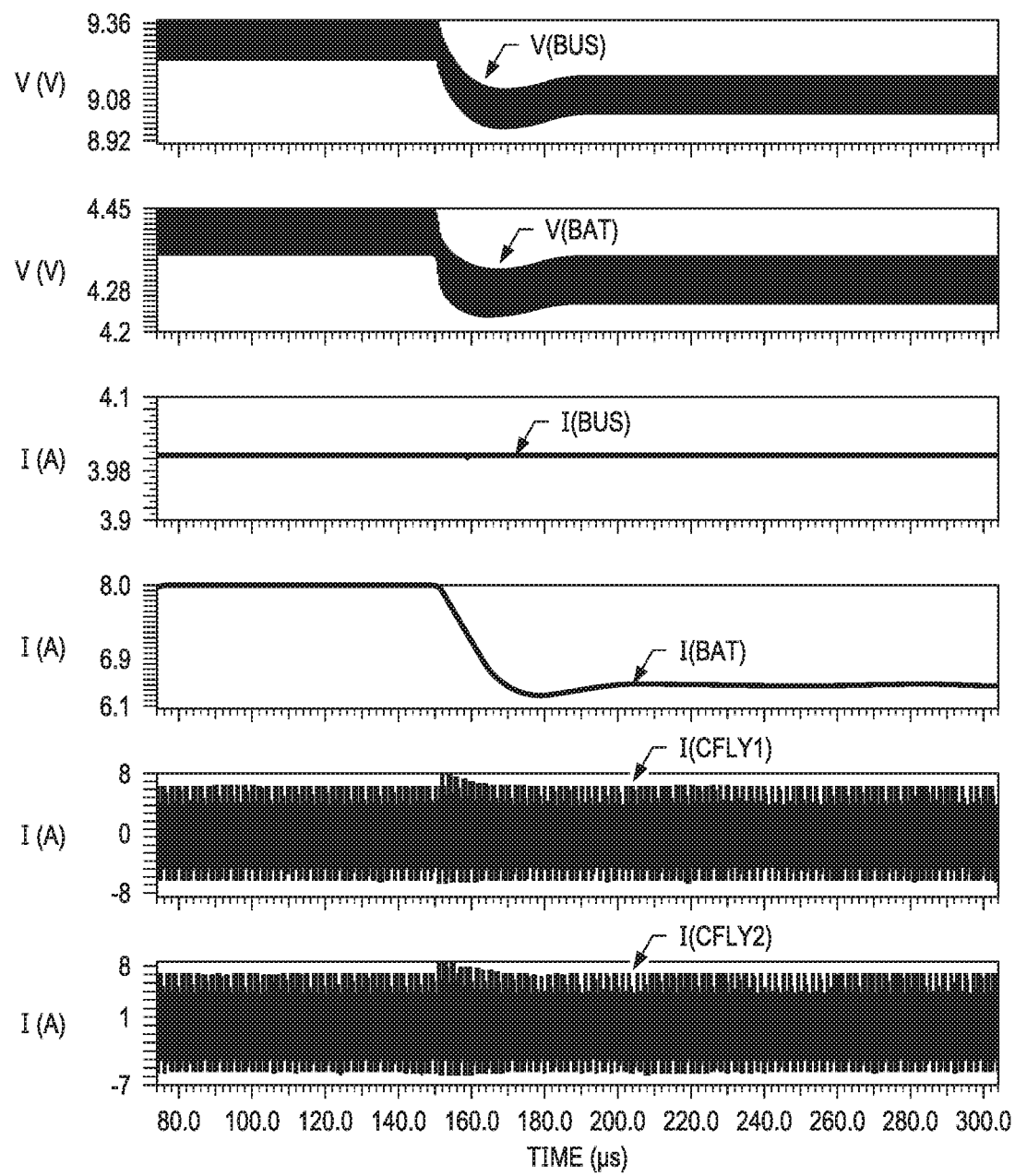

FIGS. 11A and 11B illustrate an example battery charge system board implementation, such as for a mobile phone, including a dual-phase switched-capacitor current multiplication battery charger 30 according to the Disclosure. FIG. 11B illustrates example system load response with V(BUS), V(BAT), I(BUS), I(BAT), and ICFLY1/ICFLY2.

Switched-capacitor current multiplication is implemented as an example current doubler. The switched-capacitor current multiplication battery charger 30 includes dual-phase CFLY terminals CTOP1/CBOT1 and CTOP2/CBOT2.

The switched-capacitor current multiplication battery charger architecture according to the Disclosure enable high current batter charging, while reducing the current across the bus/cable, reducing I²R losses in $R_{CONA}$, $R_{CABLE}$, $R_{COND}$ and $R_{CONTROL}$. Converter efficiency (n) can be increased to reduce power loss and thermals. Protections ensure that the battery charger can monitor all key system aspects for overvoltage, overcurrent and temperature. All USB Type-C™ cables can support between 3 A at 20 V, 5 A at 20 V.

The switched-capacitor topology enables the delivery of high current to the battery while keeping bus/cable current and voltage drops low. For example, the battery charging architecture can enable 6-A battery charging with standard 3-A-capable USB Type-C cables, delivering up to 10 A with 5-A-capable cables when using switched-capacitor devices in parallel. The switched-capacitor architecture can achieve up to 97% efficiency at 6 A delivered to the battery with only 3 A required on the USB Type-C cable, which means less than 800 mW of dissipation in the device, while requiring less than 3 A on a standard USB Type-C cable.

The switched-capacitor architecture can be used with a smart adapter to regulate the voltage and current at the input to the charger. The USB PD PPS protocol allows a sink directed source output. In this case the sink is the device and the source is the adapter. When the wall adapter is not in current foldback, the device directs the voltage output in 20-mV steps, acting as a current-limited voltage source. When the adapter is in current foldback, the adapter can maintain the voltage, and the device can direct the output current in 50-mA steps.

In summary, a system for charging a battery includes an adapter, and a charger coupled to receive power from the adapter, and to provide a charging current to the battery. The charger includes a power stage with a charge pump to provide the charging current, and a feedback circuit to provide a feedback signal to the adapter. The power stage can be one of: an adjustable current source with voltage clamp, and an adjustable voltage source with current clamp. The charge pump can be implemented as a voltage divider, so that an input adapter current is multiplied by a pre-defined divider ratio to provide the charging current. The charge pump can be one of: single-phase; and multi-phase.

The system does not require inductors, or can be implemented with small value inductors. Battery charging parameters (current, voltage etc.) are controlled by feedback regulating the adapter output current or voltage. Feedback from the charger to the adapter can be analog or digital, continuous time or sampled.

Charging is controlled as an entire system (adapter and charger working as single system). Can be adapted for use with rapid-charge adapter technology (such as FlashCharge). Uses efficient (>97%), and simple (no internal regulation) charge-pump energy conversion. No inductor is required Advantages include: (a) Very high efficiency (for example, 97% @6 A); (b) small solution size (no inductor); and (c) interfaces with new rapid-charge adapter technology by multiplying the available charging current.

The Disclosure provided by this Description and the Figures sets forth example designs and applications illustrating aspects and features of the invention, and does not limit the scope of the invention, which is defined by the claims. Known circuits, connections, functions and operations are not described in detail to avoid obscuring the principles and features of the Disclosed example designs and applications. This Disclosure can be used by ordinarily skilled artisans as a basis for modifications, substitutions and alternatives, including adaptations for other applications.

The invention claimed is:

1. A circuit comprising:
    a first transistor having a first current terminal, a second current terminal, and a first control terminal;
    a second transistor having a third current terminal, a fourth current terminal, and a second control terminal, the third current terminal coupled to the second current terminal;
    a third transistor having a fifth current terminal, a sixth current terminal, and a third control terminal, the fifth current terminal coupled to the fourth current terminal;
    a fourth transistor having a seventh current terminal, an eighth current terminal, and a fourth control terminal, the fourth control terminal coupled to the second control terminal and the seventh current terminal coupled to the sixth current terminal;
    a fifth transistor having a ninth current terminal, a tenth current terminal, and a fifth control terminal, the ninth current terminal coupled to the eighth current terminal and the fifth control terminal coupled to the third control terminal; and
    a capacitor having a first capacitor terminal and a second capacitor terminal, the first capacitor terminal coupled to the fourth current terminal and the second capacitor terminal coupled to the eighth current terminal.

2. The circuit of claim 1, wherein the capacitor is a first capacitor, the circuit further comprising a second capacitor having a third capacitor terminal and a fourth capacitor terminal, the third capacitor terminal coupled to the sixth current terminal and the fourth capacitor terminal coupled to the tenth current terminal.

3. The circuit of claim 2, further comprising a battery coupled in parallel with the second capacitor.

4. The circuit of claim 1, wherein the capacitor is a fifth capacitor, the circuit further comprising a second capacitor having a third capacitor terminal and a fourth capacitor terminal, the third capacitor terminal coupled to the third current terminal and the fourth capacitor terminal coupled to a ground terminal.

5. The circuit of claim 1, wherein the second control terminal and the fourth control terminal are configured to receive a first pulse width modulation (PWM) signal, and the third control terminal and the fourth control terminal are configured to receive a second PWM signal, in which the second PWM signal has a phase shifted 180 degrees from a phase of the first PWM signal.

6. The circuit of claim 1, wherein the tenth current terminal is coupled to a ground terminal and the first current terminal is configured to receive power from an adapter.

7. The circuit of claim 1, wherein the capacitor is a first capacitor, the circuit further comprising:
    a sixth transistor having an eleventh current terminal, a twelfth current terminal, and a sixth control terminal, the eleventh current terminal coupled to the second current terminal and the sixth control terminal coupled to the third control terminal;

a seventh transistor having a thirteenth current terminal, a fourteenth current terminal, and a seventh control terminal, the thirteenth current terminal coupled to the twelfth current terminal and the seventh control terminal coupled to the second control terminal;

an eighth transistor having a fifteenth current terminal, a sixteenth current terminal, and an eighth control terminal, the fifteenth current terminal coupled to the fourteenth current terminal and the eighth control terminal coupled to the third control terminal;

a ninth transistor having a seventeenth current terminal, an eighteenth current terminal, and a ninth control terminal, the seventeenth current terminal coupled to the sixteenth current terminal, the eighteenth current terminal coupled to the tenth current terminal, and the ninth control terminal coupled to the second control terminal; and a second capacitor having a third capacitor terminal and a fourth capacitor terminal, the third capacitor terminal coupled to the fourteenth current terminal and the fourth capacitor terminal coupled to the sixteenth current terminal.

8. The circuit of claim 1, wherein:
during a first time period, the second transistor and the fourth transistor are conducing and the third transistor and the fifth transistor are not conducting, to charge the capacitor; and
during a second time period, the second transistor and the fourth transistor are not conducting and the third transistor and the fifth transistor are not conducting, to discharge the capacitor.

9. A method comprising:
receiving, by a battery charger, a voltage or a current from an adapter, wherein the battery charger includes:
a first transistor having a first current terminal, a second current terminal, and a first control terminal;
a second transistor having a third current terminal, a fourth current terminal, and a second control terminal, the third current terminal coupled to the second current terminal;
a third transistor having a fifth current terminal, a sixth current terminal, and a third control terminal, the fifth current terminal coupled to the fourth current terminal;
a fourth transistor having a seventh current terminal, an eighth current terminal, and a fourth control terminal, the fourth control terminal coupled to the second control terminal and the seventh current terminal coupled to the sixth current terminal; and
a fifth transistor having a ninth current terminal, a tenth current terminal, and a fifth control terminal, the ninth current terminal coupled to the eighth current terminal and the fifth control terminal coupled to the third control terminal; and
a capacitor having a first capacitor terminal and a second capacitor terminal, wherein the first capacitor terminal is coupled to the fourth current terminal and the second capacitor terminal is coupled to the eighth current terminal;
charging, by the battery charger, the capacitor during a first time period, while charging a battery, wherein the capacitor is in series with the battery during the first time period; and
during a second time period, discharging, by the battery charger, the capacitor while charging the battery, wherein the capacitor is in parallel with the battery during the second time period, the second time period after the first time period.

10. The method of claim 9, further comprising:
while the battery has a voltage below a first value, charging the battery using a constant current mode; and
while the battery has a voltage above the first value and below a second value, instructing, by the battery charger, the adapter to increase the voltage or the current.

11. The method of claim 10, further comprising, while the battery has a voltage above the second value, instructing, by the battery charger, the adapter to reduce the voltage or the current in increments.

12. The method of claim 9, wherein:
during the first time period, a first transistor and a third transistor are conducting and a second transistor and a fourth transistor are not conducting; and
during the second time period, the first transistor and the third transistor are not conducting and the second transistor and the fourth transistor are conducting.

13. The method of claim 9, wherein the first time period is approximately equal to the second time period.

14. A system comprising:
an adapter configured to produce power;
a bus coupled to the adapter; and
a battery charger coupled to the adapter over the bus, the battery charger configured to:
during a first time period, charge a capacitor while charging a battery using the power, wherein the capacitor is in series with the battery during the first time period; and
during a second time period, discharge the capacitor while charging the battery using the power, wherein the capacitor is in parallel with the battery during the second time period;
wherein the battery charger includes:
a first transistor having a first current terminal, a second current terminal, and a first control terminal;
a second transistor having a third current terminal, a fourth current terminal, and a second control terminal, the third current terminal coupled to the second current terminal;
a third transistor having a fifth current terminal, a sixth current terminal, and a third control terminal, the fifth current terminal coupled to the fourth current terminal;
a fourth transistor having a seventh current terminal, an eighth current terminal, and a fourth control terminal, the fourth control terminal coupled to the second control terminal and the seventh current terminal coupled to the sixth current terminal; and
a fifth transistor having a ninth current terminal, a tenth current terminal, and a fifth control terminal, the ninth current terminal coupled to the eighth current terminal and the fifth control terminal coupled to the third control terminal; and
a capacitor having a first capacitor terminal and a second capacitor terminal, wherein the first capacitor terminal is coupled to the fourth current terminal and the second capacitor terminal is coupled to the eighth current terminal.

15. The system of claim 14, wherein the battery charger includes a power stage having an adjustable current source and a voltage clamp.

16. The system of claim 14, wherein the battery charger includes a power stage having an adjustable voltage source and a current clamp.

17. The system of claim 14, wherein the battery charger includes a single-phase charge pump.

18. The system of claim 14, wherein the battery charger includes a multi-phase charge pump.

19. The system of claim 14, wherein the battery is coupled to the battery charger.

* * * * *